United States Patent
Lee et al.

(10) Patent No.: US 9,913,136 B2
(45) Date of Patent: Mar. 6, 2018

(54) METHOD AND APPARATUS FOR APPLYING SECURITY INFORMATION IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 14/760,368

(22) PCT Filed: Jan. 10, 2014

(86) PCT No.: PCT/KR2014/000328
§ 371 (c)(1),
(2) Date: Jul. 10, 2015

(87) PCT Pub. No.: WO2014/109602
PCT Pub. Date: Jul. 17, 2014

(65) Prior Publication Data
US 2015/0358813 A1    Dec. 10, 2015

Related U.S. Application Data

(60) Provisional application No. 61/751,284, filed on Jan. 11, 2013.

(51) Int. Cl.
*H04L 29/06* (2006.01)
*H04W 12/04* (2009.01)
(Continued)

(52) U.S. Cl.
CPC ............. *H04W 12/04* (2013.01); *H04L 63/18* (2013.01); *H04L 2463/061* (2013.01); *H04W 12/02* (2013.01); *H04W 12/10* (2013.01)

(58) Field of Classification Search
CPC ..... H04W 12/04; H04W 12/02; H04W 12/10; H04L 63/18; H04L 2463/061
See application file for complete search history.

(56) References Cited

U.S. PATENT DOCUMENTS 8,094,817 B2 * 1/2012 Blom .................. H04L 9/321
380/277
9,295,077 B2 * 3/2016 Guo .................. H04W 72/1268
(Continued)

FOREIGN PATENT DOCUMENTS

| CN | 102474717 A | 5/2012 |
| CN | 102740289 A | 10/2012 |

(Continued)

OTHER PUBLICATIONS

LG Electronics Inc.: "UP Radio Protocol for Dual Connectivity," 3GPP TSG-RAN2 Meeting #81bis, R2-131231, Apr. 15-19, 2013.
(Continued)

*Primary Examiner* — Mohammad A Siddiqi
(74) *Attorney, Agent, or Firm* — Dentons US LLP

(57) ABSTRACT

A method and apparatus for applying security information in a wireless communication system is provided. A user equipment (UE) obtains first security information and second security information, applies the first security information to a first set of radio bearers (RBs) which is served by a master eNodeB (MeNB), and applies the second security information to a second set of RBs which is served by a secondary eNodeB (SeNB).

10 Claims, 12 Drawing Sheets

(51) Int. Cl.
*H04W 12/10* (2009.01)
*H04W 12/02* (2009.01)

(56) References Cited

U.S. PATENT DOCUMENTS

| | | | |
|---|---|---|---|
| 9,320,077 B2* | 4/2016 | Guo | H04W 24/10 |
| 2006/0140411 A1* | 6/2006 | Zhu | H04L 9/0822 380/277 |
| 2011/0091036 A1 | 4/2011 | Norrman et al. | |
| 2011/0176680 A1 | 7/2011 | Wu | |
| 2011/0274276 A1 | 11/2011 | Xu | |
| 2012/0008776 A1* | 1/2012 | Ishida | H04W 12/04 380/247 |
| 2014/0056243 A1* | 2/2014 | Pelletier | H04W 74/04 370/329 |
| 2015/0016367 A1* | 1/2015 | Koskinen | H04L 5/001 370/329 |

FOREIGN PATENT DOCUMENTS

| | | |
|---|---|---|
| CN | 102833741 A | 12/2012 |
| EP | 2109278 A1 | 10/2009 |
| EP | 2273808 A1 | 1/2011 |
| JP | 2009-253985 A | 10/2009 |
| JP | 2010157807 A | 7/2010 |
| JP | 2011024037 A | 2/2011 |
| JP | 2012-134975 A | 7/2012 |
| WO | 2014109968 A1 | 7/2014 |

OTHER PUBLICATIONS

NTT DoCoMo, Inc.: "Requirements, Candidate Solutions & Technology Roadmap for LTE Rel-12 Onward", 3GPP Workshop on Release 12 and onwards, RWS-120010, Jun. 11-12, 2012.

R2-095693:3GPP TSG-RAN WG2 #67bis, Oct. 12th-16th 2009, Miyazaki, Japan, LG Electronics Inc., "Serving Cell Handling in CA," 1-14.

* cited by examiner

METHOD AND APPARATUS FOR APPLYING SECURITY INFORMATION IN WIRELESS COMMUNICATION SYSTEM

This application is a 35 USC § 371 National Stage entry of International Application No. PCT/KR2014/000328 filed on Jan. 10, 2014, which claims priority to U.S. Provisional Application No. 61/751,284, filed on Jan. 11, 2013, all of which are incorporated by reference in their entirety herein.

BACKGROUND OF THE INVENTION

Field of the Invention

The present invention relates to wireless communications, and more specifically, to a method and apparatus for applying security information in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for 3GPP LTE will focus on additional functionalities for enhanced performance in hotspot areas for indoor and outdoor using low power nodes.

Some of activities will focus on achieving an even higher degree of interworking between the macro and low-power layers, including different forms of macro assistance to the low-power layer and dual-layer connectivity. Dual connectivity implies that the device has simultaneous connections to both macro and low-power layers. Macro assistance including dual connectivity may provide several benefits:

- Enhanced support for mobility—by maintaining the mobility anchor point in the macro layer, it is possible to maintain seamless mobility between macro and low-power layers, as well as between low-power nodes.
- Low overhead transmissions from the low-power layer—by transmitting only information required for individual user experience, it is possible to avoid overhead coming from supporting idle-mode mobility within the local-area layer, for example.
- Energy-efficient load balancing—by turning off the low-power nodes when there is no ongoing data transmission, it is possible to reduce the energy consumption of the low-power layer.
- Per-link optimization—by being able to select the termination point for uplink and downlink separately, the node selection can be optimized for each link.

To support the dual connectivity, various changes may be required in current 3GPP LTE radio protocols. For example, a method for applying security information when the dual connectivity is introduced may be required.

SUMMARY OF THE INVENTION

The present invention provides a method and apparatus for applying security information in a wireless communication system. The present invention provides a method for applying security information in dual connectivity. The present invention also provides a method for applying different security information to different sets of radio bearers which is served by a master eNodeB (MeNB) and a secondary eNodeB (SeNB) respectively.

In an aspect, a method for applying, by a user equipment (UE), security information in a wireless communication system is provided. The method includes obtaining first security information and second security information, applying the first security information to a first set of radio bearers (RBs) which is served by a master eNodeB (MeNB), and applying the second security information to a second set of RBs which is served by a secondary eNodeB (SeNB).

The first security information may include at least one of a first security parameter and a first security key, and the second security information may include at least one of a second security parameter and a second security key.

The method may further include deriving the first security key based on the first security parameter.

The first security key may be KRRCint, KRRCenc, or KUPenc for the MeNB.

The method may further include deriving the second security key from the first security key with the first security parameter.

The second security key may be KRRCint, KRRCenc, or KUPenc for the SeNB.

Obtaining the first security information may include receiving the first security information from the MeNB via a security mode command message.

Obtaining the second security information may include receiving the second security information from the MeNB via a security mode command message.

The first security information may be applied to one or more cells of the MeNB.

The second security information may be applied to one or more cells of the SeNB.

The UE may have a first connection with the MeNB for signaling.

The first connection may be a radio resource control (RRC) connection.

The UE may have a second connection with the SeNB for a user traffic.

The second connection may be an L2 connection.

In another aspect, a user equipment (UE) in a wireless communication system is provided. The UE includes a radio frequency (RF) unit for transmitting or receiving a radio signal, and a processor coupled to the RF unit, and configured to obtain first security information and second security information, apply the first security information to a first set of radio bearers (RBs) which is served by a master eNodeB (MeNB), and apply the second security information to a second set of RBs which is served by a secondary eNodeB (SeNB).

Security information can be applied efficiently in dual connectivity.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
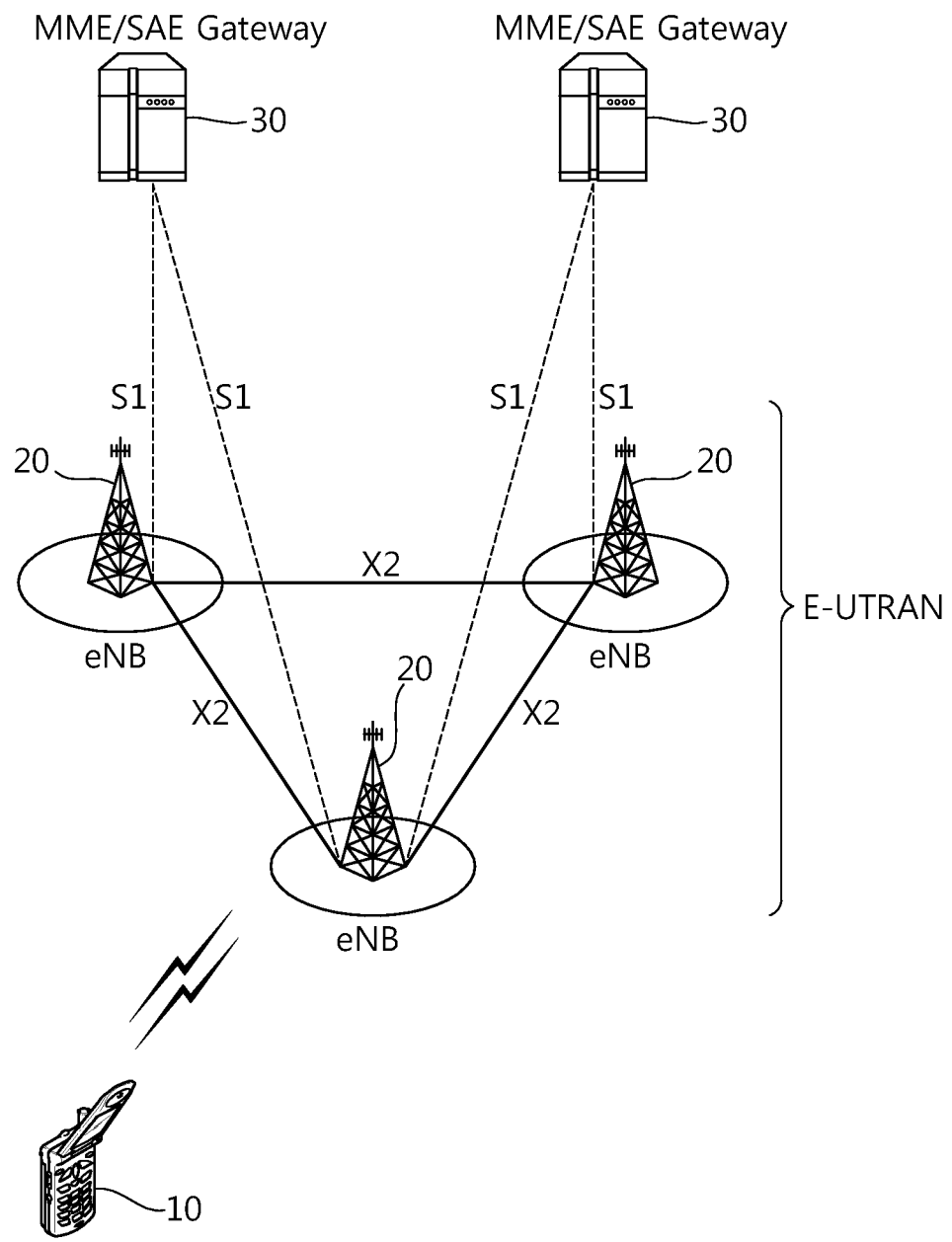
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
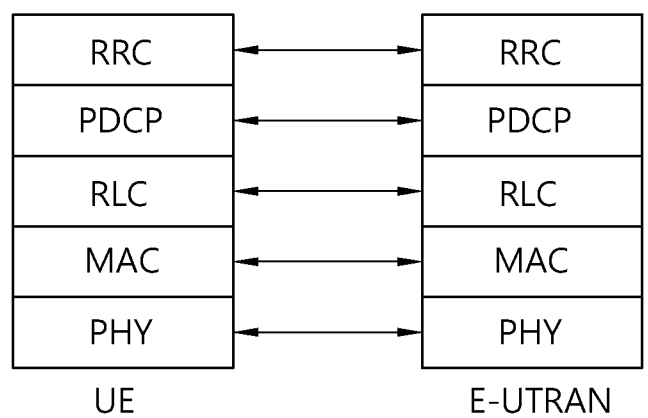
FIG. 2 shows a control plane of a radio interface protocol of an LTE system.
Figure 3:
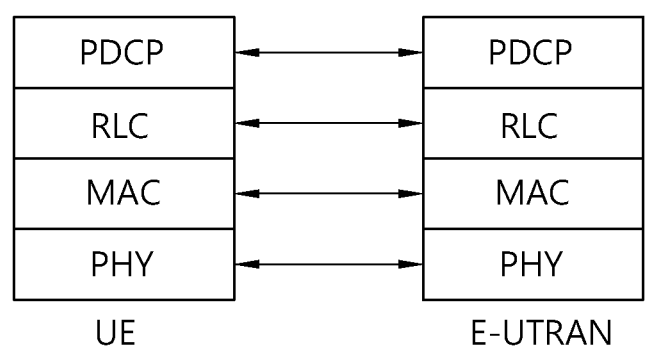
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
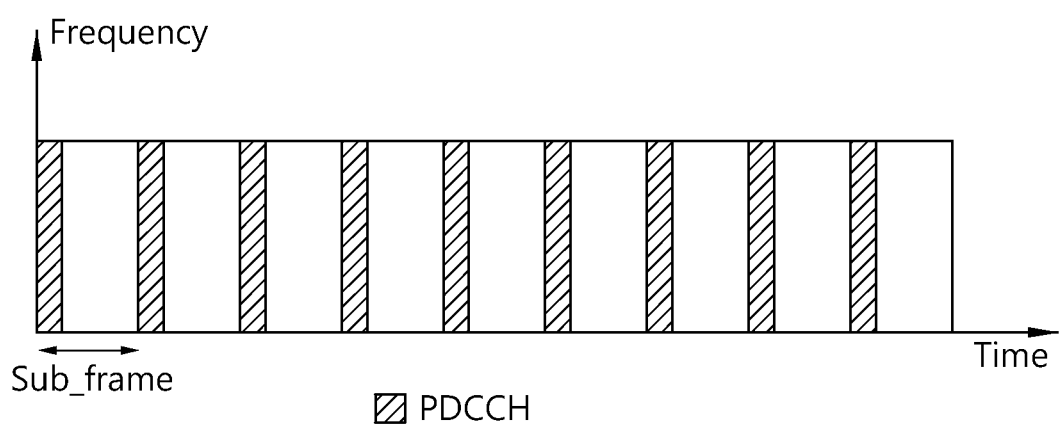
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped to the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−*Rx*Pilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

Figure 5:
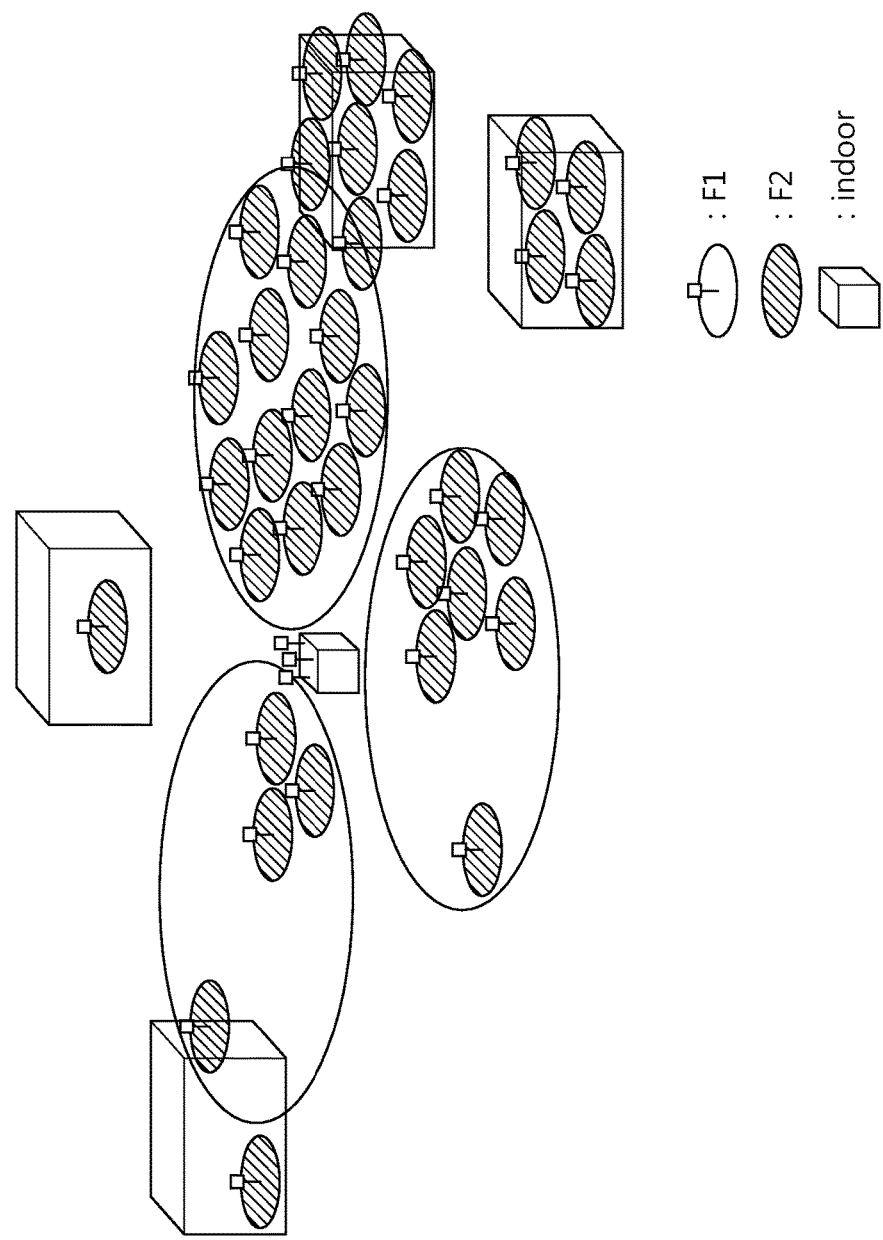
FIG. 5 shows deployment scenarios of small cells with/ without macro coverage.

FIG. 5 shows deployment scenarios of small cells with/without macro coverage. It may be referred to Section 6.1 of 3GPP TR 36.932 V12.0.0 (2012-12). Small cell enhancement should target both with and without macro coverage, both outdoor and indoor small cell deployments and both ideal and non-ideal backhaul. Both sparse and dense small cell deployments should be considered.

Referring to FIG. 5, small cell enhancement should target the deployment scenario in which small cell nodes are deployed under the coverage of one or more than one overlaid E-UTRAN macro-cell layer(s) in order to boost the capacity of already deployed cellular network. Two scenarios where the UE is in coverage of both the macro cell and the small cell simultaneously, and where the UE is not in coverage of both the macro cell and the small cell simultaneously can be considered. Also, the deployment scenario where small cell nodes are not deployed under the coverage of one or more overlaid E-UTRAN macro-cell layer(s) may be considered.

Small cell enhancement should target both outdoor and indoor small cell deployments. The small cell nodes could be deployed indoors or outdoors, and in either case could provide service to indoor or outdoor UEs.

Security function is described.

The security function provides integrity protection and ciphering. The integrity protection prevents user data and signaling from being altered in an unauthorized manner, and the ciphering provides confidentiality of user data and signaling.

There are two levels of security between the UE and the network.

1) AS security: The AS security protects the RRC signaling and the user data between the UE and the E-UTRAN. It provides integrity protection and ciphering of the RRC signaling on the control plane of the radio protocols. It also provides ciphering of the user data on the user plane of the radio protocols. The security mode command procedure in the RRC is used to activate the AS security between the UE and the E-UTRAN.

2) NAS security: The NAS security protects the NAS signaling between the UE and the MME. It provides integrity protection and ciphering of the NAS signaling. The security mode command procedure in the NAS is used to activate the NAS security between the UE and the MME.

Figure 6:
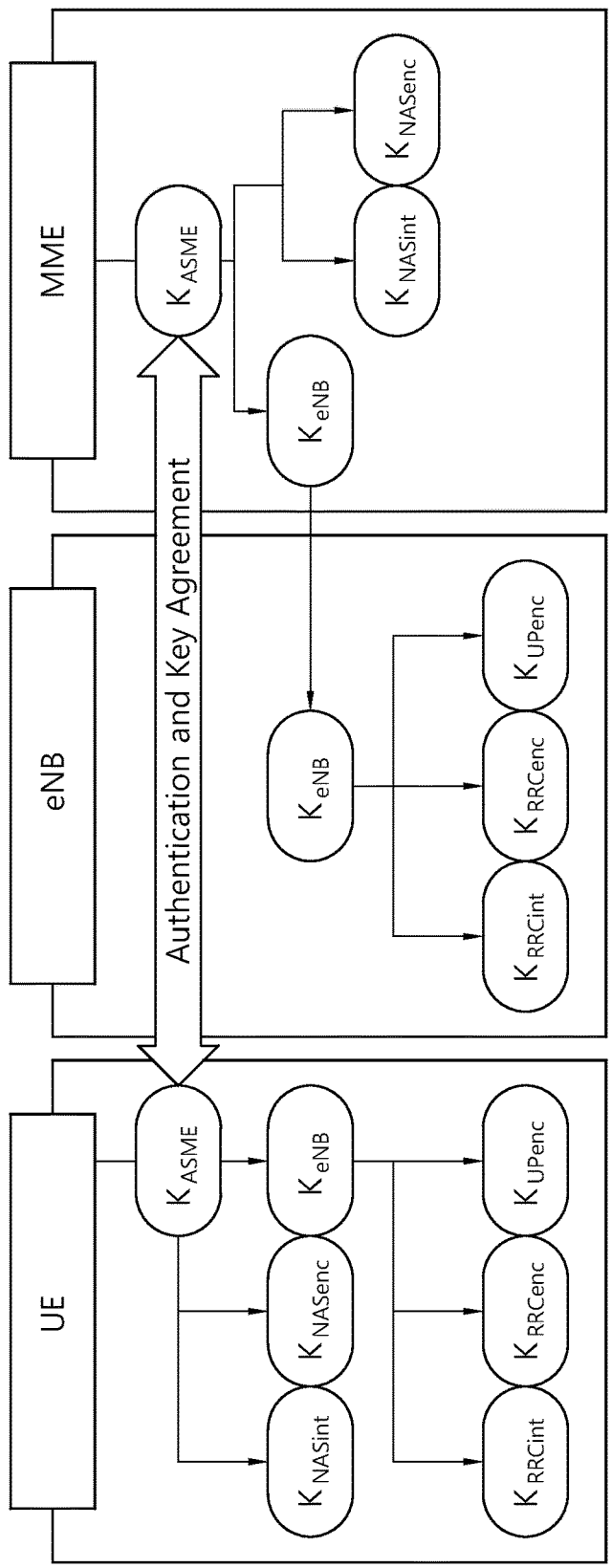
FIG. 6 shows a key derivation for an AS security and NAS security except handover.

FIG. 6 shows a key derivation for an AS security and NAS security except handover.

The security function between the UE and the network is based on the secret key called $K_{ASME}$. The $K_{ASME}$ is derived from the permanent key that is stored in both the universal subscriber identity module (USIM) and the home subscriber server (HSS). The MME receives the $K_{ASME}$ from the HSS. The UE derives the $K_{ASME}$ as a result of the authentication and key agreement (AKA) procedure in the NAS protocols. During the AKA procedure, the UE and the network perform mutual authentication and agree on the $K_{ASME}$.

The UE and the MME derive the $K_{NASint}$ for integrity protection of the NAS messages and the $K_{NASenc}$ for ciphering of the NAS messages by using the $K_{ASME}$. The UE and the eNB derive the $K_{eNB}$ from the $K_{ASME}$ for protection of signaling and user data on the Uu interface between the UE and the eNB. From the $K_{eNB}$, the UE and the eNB derive the $K_{RRCint}$ for integrity protection of the RRC messages, the $K_{RRCenc}$ for ciphering of the RRC messages, and the $K_{UPenc}$ for ciphering of user data.

The four AS keys ($K_{eNB}$, $K_{RRCint}$, $K_{RRCenc}$, and $K_{UPenc}$) change upon every handover and connection re-establishment. For handover from a source eNB to a target eNB, the UE and the source eNB derive the $K_{eNB}^*$ which is a new $K_{eNB}$ used at the target cell. The other AS keys, i.e., $K_{RRCint}$, $K_{RRCenc}$, and $K_{UPenc}$, are derived from the $K_{eNB}^*$. The $K_{eNB}^*$ is derived based on either the current $K_{eNB}$ or a fresh next hop (NH) in the UE and the eNB. The physical cell ID and downlink carrier frequency of the target cell are also used for derivation of the $K_{eNB}^*$. The NH is derived in the UE and the MME from the $K_{ASME}$. The eNB receives the NH from the MME to derive the $K_{eNB}^*$ for handovers. An intra-cell handover procedure may be used to change the AS keys in RRC_CONNECTED.

Activation of the AS security is initiated by the eNB after the initial context setup procedure over the S1 interface is initiated by the MME. During the initial context setup procedure, the MME informs the eNB about the $K_{eNB}$ derived directly from $K_{ASME}$ for AS key derivation and the algorithms of integrity protection and ciphering supported in the UE. Thus, after receiving the $K_{eNB}$ and the algorithms from the MME, the eNB can initiate activation of AS security with the UE.

Figure 7:
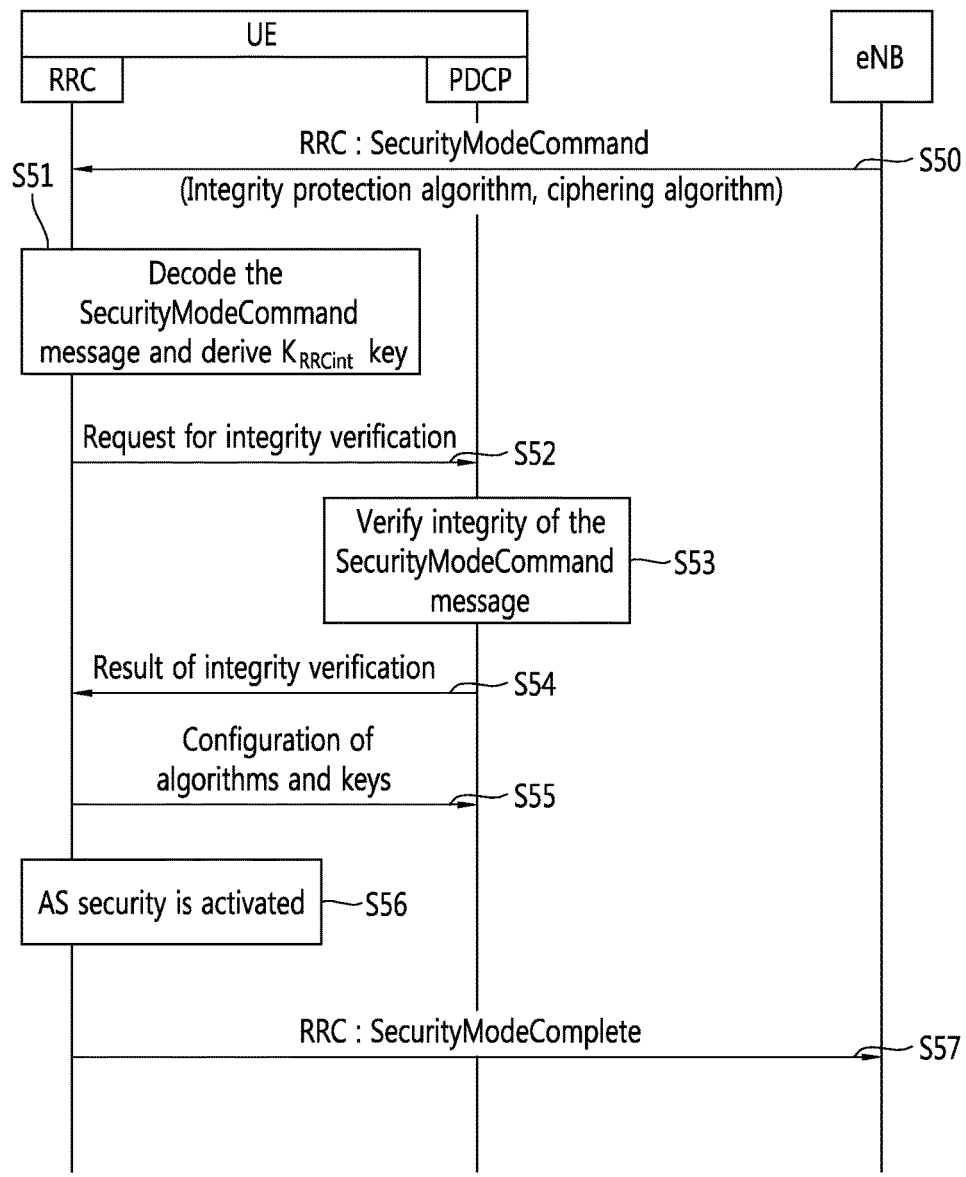
FIG. 7 shows an initial activation of AS security.

FIG. 7 shows an initial activation of AS security.

For initial activation of AS security, in step S50, the eNB transmits the SecurityModeCommand message indicating the integrity protection algorithm and the ciphering algorithm to the RRC layer of the UE after the RRC connection establishment procedure is completed.

The RRC layer of the UE receives the SecurityModeCommand message before configuring the PDCP layer of the UE to apply integrity protection. Thus, in step S51, upon receiving the SecurityModeCommand message, the RRC layer of the UE decodes the SecurityModeCommand message, and derives the $K_{RRCint}$ for integrity protection of the RRC messages with the algorithm indicated by the received SecurityModeCommand message. In step S52, the RRC layer of the UE requests the PDCP layer of the UE to verify the integrity of the received SecurityModeCommand message using the algorithm and the $K_{RRCint}$.

Note that the SecurityModeCommand message is transmitted with integrity protection even though the AS security is not activated in the UE. This is because the UE can verify the integrity of the message using the algorithm included in the message. However, ciphering is not applied to the SecurityModeCommand message because the UE cannot decode the message until the ciphering algorithm included in the message is applied.

In step S53, the PDCP layer of the UE verifies the integrity of the SecurityModeCommand message. In step S54, the PDCP layer of the UE transmits a result of the integrity verification. If the UE fails to verify the integrity of SecurityModeCommand message, the UE transmits the SecurityModeFailure message to the eNB in response to the SecurityModeCommand message. In this case, neither integrity protection nor ciphering is applied to the SecurityModeFailure message because valid algorithms are not available in the UE.

If the received SecurityModeCommand message passes the integrity verification in the PDCP layer of the UE, the RRC layer of the UE further derives the $K_{RRCenc}$ and the $K_{UPenc}$. In step S55, the RRC layer of the UE configures the PDCP layer of the UE to apply integrity protection using the integrity protection algorithm and the $K_{RRCint}$, and to apply ciphering using the ciphering algorithm, the $K_{RRCenc}$, and the $K_{UPenc}$. Then, in step S56, the UE considers AS security to be activated, and applies both integrity protection and ciphering to all subsequent RRC messages received and sent by the UE.

Upon the activation of AS security, in step S57, the RRC layer of the UE transmits the SecurityModeComplete message to the eNB in response to the SecurityModeCommand message. The SecurityModeComplete message is integrity protected but not ciphered. The reason for not applying ciphering to the SecurityModeComplete message is that by transmitting both response messages, i.e., SecurityModeFailure and SecurityModeComplete messages, unciphered, the eNB can easily decode the response message without deciphering regardless of whether the security activation is successful or not in the UE.

After AS security is activated, the eNB establishes SRB2 and DRBs. The eNB does not establish SRB2 and DRBs prior to activating AS security. Once AS security is activated, all RRC messages over SRB1 and SRB2 are integrity protected and ciphered, and all user data over DRBs are ciphered by the PDCP layer. However, neither integrity protection nor ciphering applies for SRB0.

The integrity protection algorithm is common for signaling radio bearers SRB1 and SRB2, and the ciphering algorithm is common for all radio bearers (i.e., SRB1, SRB2, and DRBs). The integrity protection and ciphering algorithms can be changed only upon handover.

A secondary cell (SCell) configuration is described

SCell addition/modification is described first. It may be referred to Section 5.3.10.3b of 3GPP TS 36.331 V11.1.0 (2012-09). The UE shall:

1> for each sCellIndex value included in the sCellToAddModList that is not part of the current UE configuration (SCell addition):
2> add the SCell, corresponding to the cellIdentification, in accordance with the received radioResourceConfigCommonSCell and radioResourceConfigDedicatedSCell;
2> configure lower layers to consider the SCell to be in deactivated state;
1> for each sCellIndex value included in the sCellToAddModList that is part of the current UE configuration (SCell modification):
2> modify the SCell configuration in accordance with the received radioResourceConfigDedicatedSCell.

SCell release is described. It may be referred to Section 5.3.10.3a of 3GPP TS 36.331 V11.1.0 (2012-09). The UE shall:

1> if the release is triggered by reception of the sCellToReleaseList:
2> for each sCellIndex value included in the sCellToReleaseList:
3> if the current UE configuration includes an SCell with value sCellIndex:
4> release the SCell;
1> if the release is triggered by RRC connection re-establishment:
2> release all SCells that are part of the current UE configuration.

Dual connectivity for small cell enhancement has been studied. Dual connectivity may imply:

Control and data separation where, for instance, the control signaling for mobility is provided via the macro layer at the same time as high-speed data connectivity is provided via the low-power layer.
A separation between downlink and uplink, where downlink and uplink connectivity is provided via different layers.
Diversity for control signaling, where radio resource control (RRC) signaling may be provided via multiple links, further enhancing mobility performance.

Figure 8:
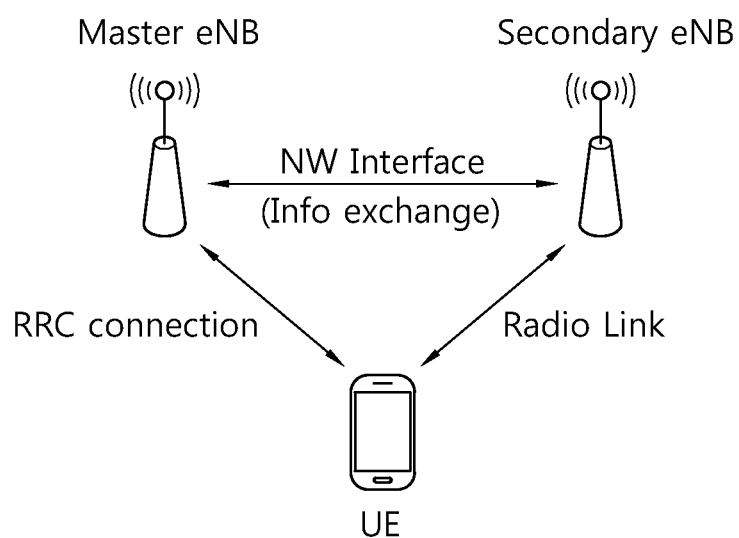
FIG. 8 shows a scenario of dual connectivity.

FIG. 8 shows a scenario of dual connectivity.

Referring to FIG. 8, the UE has an RRC connection with the master eNB (hereinafter, MeNB). In dual connectivity, the MeNB controls the macro cell, and is the eNB which terminates at least S1-MME and therefore act as mobility anchor towards the CN. Also, the UE has a radio link with the secondary eNB (hereinafter, SeNB). In dual connectivity, the SeNB controls one or more small cells, and is the eNB providing additional radio resources for the UE, which is not the MeNB. Accordingly, the UE may receive control signaling from the MeNB, and may receive data from the SeNB. The MeNB and SeNB has a network interface between thereof, and therefore, information may be exchanged between the MeNB and SeNB.

Security function applied in the dual connectivity has not been developed. Accordingly, a method for applying security information in the dual connectivity may be required.

Figure 9:
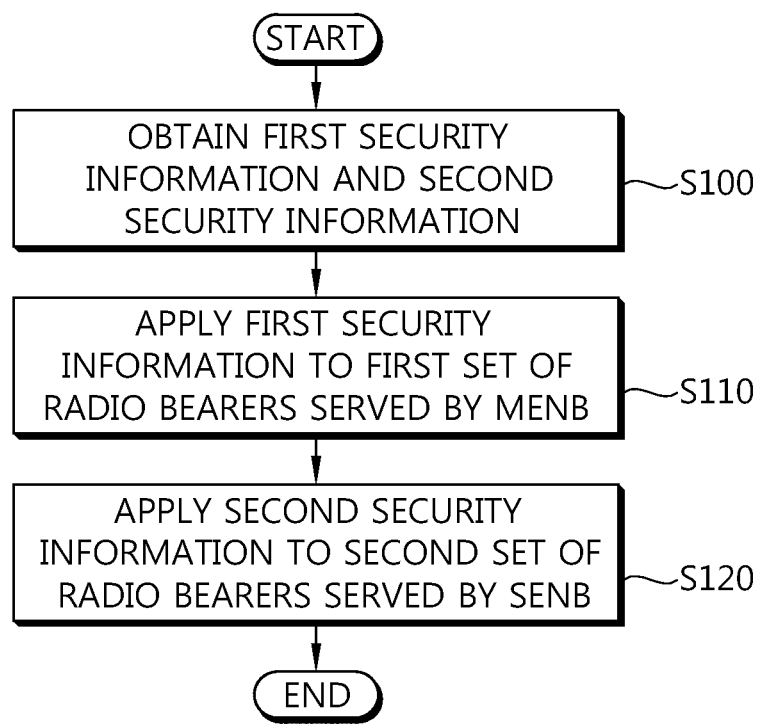
FIG. 9 shows an example of a method for applying security information according to an embodiment of the present invention.

FIG. 9 shows an example of a method for applying security information according to an embodiment of the present invention.

Referring to FIG. 9, in step S100, the UE obtains first security information and second security information. It assumed that the UE has a first connection for signaling with the MeNB, and the UE has a second connection for a user traffic with the SeNB. The first connection may be an RRC connection. The second connection may be an L2 connection.

The first security information may be received from the MeNB via a security mode command message. The first security information may include of a first security parameter and/or a first security key. For example, the first security information may include both the first security parameter and the first security key. For example, the first security information may include only the first security parameter. At this case, the first security parameter may be received from the MeNB via the security mode command message, and the first security key may be derived based on the first security parameter. The first security key may be $K_{RRCint}$, $K_{RRCenc}$, or $K_{UPenc}$ for the MeNB.

The second security information may be received from the MeNB via the security mode command message. The second security information may include of a second security parameter and/or a second security key. For example, the second security information may include both the second security parameter and the second security key. For example, the second security information may include only the second security parameter. At this case, the second security parameter may be received from the MeNB via the security mode command message, and the second security key may be derived based on the second security parameter. Alternatively, the second security key may be derived based on the first security key with the first security parameter. The second security key may be $K_{RRCint}$, $K_{RRCenc}$, or $K_{UPenc}$ for the SeNB.

In the description above, the security key is applied to integrity protection or chipering. The first security parameter may contain next hop and encryption algorithm. Also, a signaling key may be derived from the first security key with the first security parameter. The signaling key may be used for the UE to encrypt user traffic from the MeNB and to decrypt user traffic received by the MeNB. Also, a user traffic key may be derived from the second security key with the first security parameter or the second security parameter.

In step S110, the UE applies the first security information to a first set of RBs which is served by the MeNB. The first security information may be applied to one or more cells of the MeNB. Using the first security information, the UE may encrypt signaling transmitted from the MeNB and decrypting signaling received by the MeNB.

Figure 10:
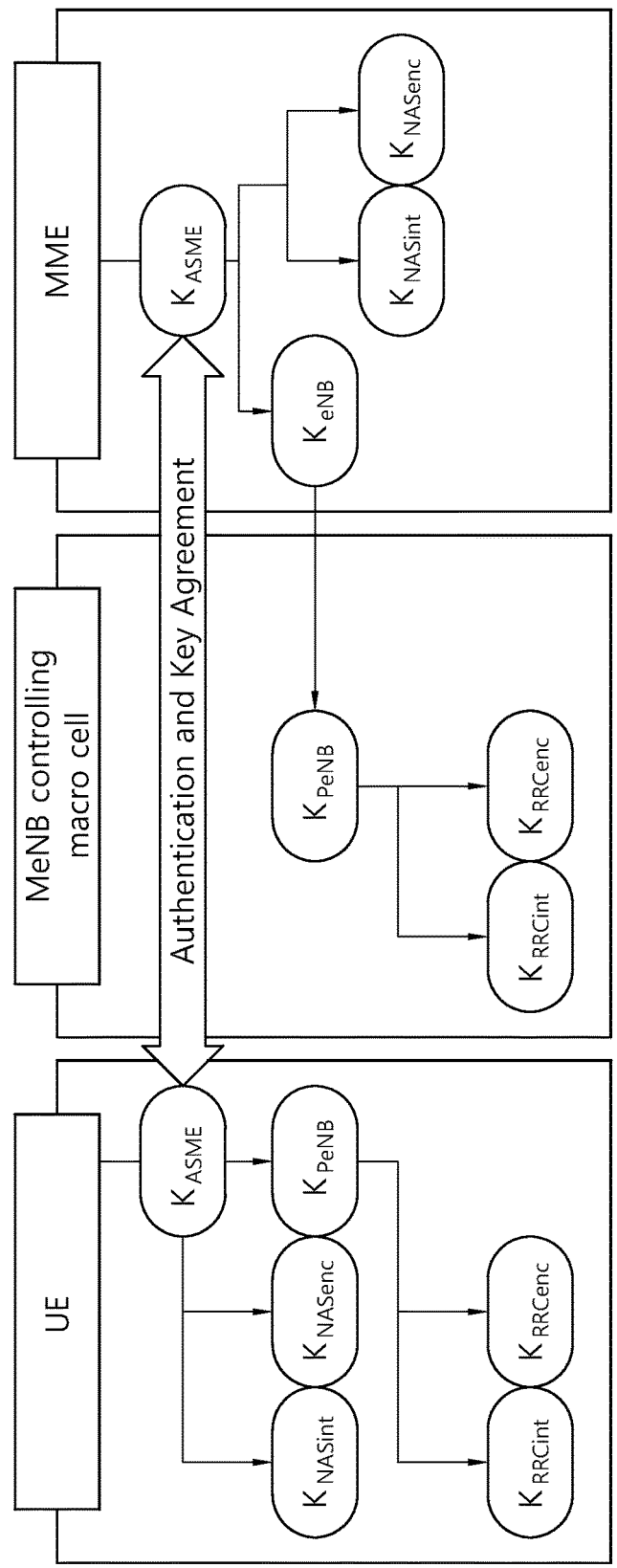
FIG. 10 shows how a UE and MeNB generate security keys for radio RBs between the UE and macro cell according to an embodiment of the present invention.

In step S120, the UE applies the second security information to a second set of RBs which is served by the SeNB. The second security information may be applied to one or more cells of the SeNB. Using the second security information, the UE may encrypt user traffic transmitted from the SeNB and decrypting user traffic received by the SeNB;

FIG. 10 shows how a UE and MeNB generate security keys for radio RBs between the UE and macro cell according to an embodiment of the present invention. Referring to FIG. 10, the MeNB receives $K_{PeNB}$, which is an eNB security key for the MeNB, from the MME. The MeNB derives two security keys for RRC messages from $K_{PeNB}$, i.e., $K_{RRCint}$ for integrity protection of RRC messages and $K_{RRCenc}$ for chipering of RRC messages.

Figure 11:
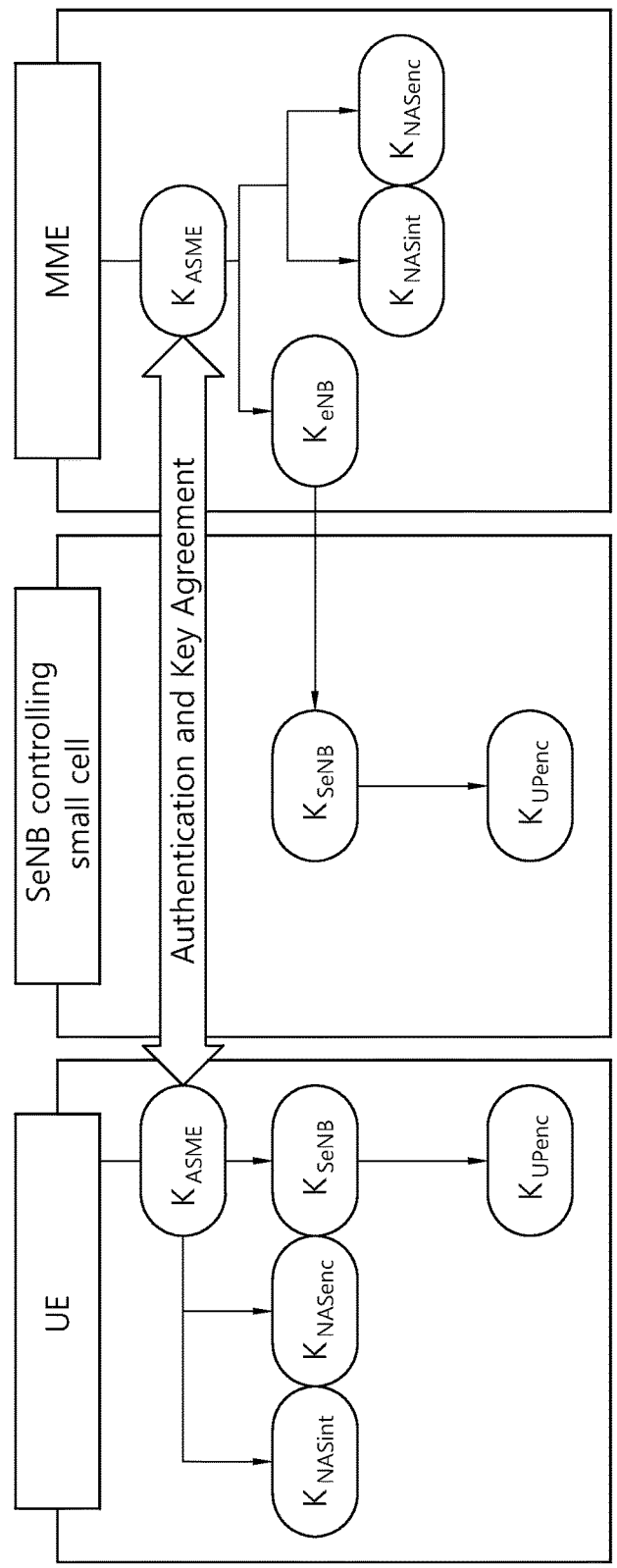
FIG. 11 shows how a UE and SeNB generate security keys for radio RBs between the UE and small cell according to an embodiment of the present invention.

FIG. 11 shows how a UE and SeNB generate security keys for radio RBs between the UE and small cell according to an embodiment of the present invention. Referring to FIG. 11, the SeNB receives $K_{seNB}$, which is an eNB security key for the SeNB, from the MME. Alternatively, the SeNB receives $K_{seNB}$ from the MeNB. Then, SeNB derives a security key for user traffic from $K_{seNB}$, i.e., $K_{UPenc}$ for chipering of user traffic.

Hereinafter, a security mode command procedure according to an embodiment of the present invention is described in detail.

When the UE is connected to both the MeNB and SeNB, the UE receives the security mode command message and then generate security keys for both the MeNB and SeNB according to the security mode command procedure as described below. The UE may receive separate security mode command messages, one message for the MeNB and the other message for the SeNB.

Upon receiving the SecurityModeCommand message corresponding to the first group of one or more RBs or the first group of one or more cells from the MeNB, UE shall:

1> derive the $K_{eNB}$ key for the MeNB, i.e., the $K_{MeNB}$;

1> derive the $K_{RRCint}$ key associated with the integrity-ProtAlgorithm indicated in the SecurityModeCommand message;

1> request lower PDCP layer used for RRC messages in order to verify the integrity protection of the SecurityModeCommand message, using the algorithm indicated by the integrityProtAlgorithm as included in the SecurityModeCommand message and the $K_{RRCint}$ key;

1> if the SecurityModeCommand message passes the integrity protection check:

2> derive the $K_{RRCenc}$ key associated with the cipheringAlgorithm indicated in the SecurityModeCommand message;

2> configure lower PDCP layer used for RRC messages in order to apply integrity protection using the indicated algorithm and the $K_{RRCint}$ key immediately, i.e., integrity protection shall be applied to all subsequent messages received and sent by the UE, including the SecurityModeComplete message;

2> configure lower PDCP layer used for RRC messages in order to apply ciphering using the indicated algorithm, the $K_{RRCenc}$ key after completing the procedure, i.e., ciphering shall be applied to all subsequent messages received and sent by the UE, except for the SecurityModeComplete message which is sent unciphered;

2> consider AS security to be activated for the communication between the UE and any cell of the MeNB (e.g., PCell);

2> submit the SecurityModeComplete message to lower layers for transmission, upon which the procedure ends;

1> else:

2> continue using the configuration used prior to the reception of the SecurityModeCommand message, i.e., neither apply integrity protection nor ciphering.

2> submit the SecurityModeFailure message to lower layers for transmission, upon which the procedure ends.

After receiving the SecurityModeCommand corresponding to the MeNB from the MeNB, UE may receive another SecurityModeCommand corresponding to the SeNB from either the PeNB or SeNB. The UE may receive the SecurityModeCommand corresponding to the SeNB after receiving a RRC connection reconfiguration message that configures a cell of the SeNB as a serving cell.

Alternatively, the SecurityModeCommand corresponding to the MeNB can also service as the SecurityModeCommand corresponding to the SeNB. Namely, a single SecurityModeCommand can be used for both the PeNB and SeNB.

Upon receiving the SecurityModeCommand corresponding to the second group of one or more RBs or the second group of one or more cells from the SeNB, UE shall:

1> derive the $K_{eNB}$ key for SeNB, i.e. $K_{seNB}$;

1> if the SecurityModeCommand message passes the integrity protection check:

2> derive the $K_{UPenc}$ key associated with the cipheringAlgorithm indicated in the SecurityModeCommand message;

2> if connected as an RN:

3> derive the $K_{UPint}$ key associated with the integrityProtAlgorithm indicated in the SecurityModeCommand message;

2> configure lower PDCP layer used for user traffic in order to apply ciphering using the indicated algorithm, the $K_{UPenc}$ key after completing the procedure, i.e., ciphering shall be applied to all user traffic received and sent by the UE for DRBs between the UE and the SeNB.

2> if connected as an RN:

3> configure lower PDCP layer used for user traffic in order to apply integrity protection using the indicated algorithm and the $K_{UPint}$ key, for DRBs that are subsequently configured to apply integrity protection, if any;

2> consider AS security to be activated for the communication between the UE and any cell of the SeNB (e.g., SCell);

2> submit the SecurityModeComplete message to lower layers for transmission, upon which the procedure ends;

1> else:

2> continue using the configuration used prior to the reception of the SecurityModeCommand message, i.e., neither apply integrity protection nor ciphering.

2> submit the SecurityModeFailure message to lower layers for transmission, upon which the procedure ends.

Figure 12:
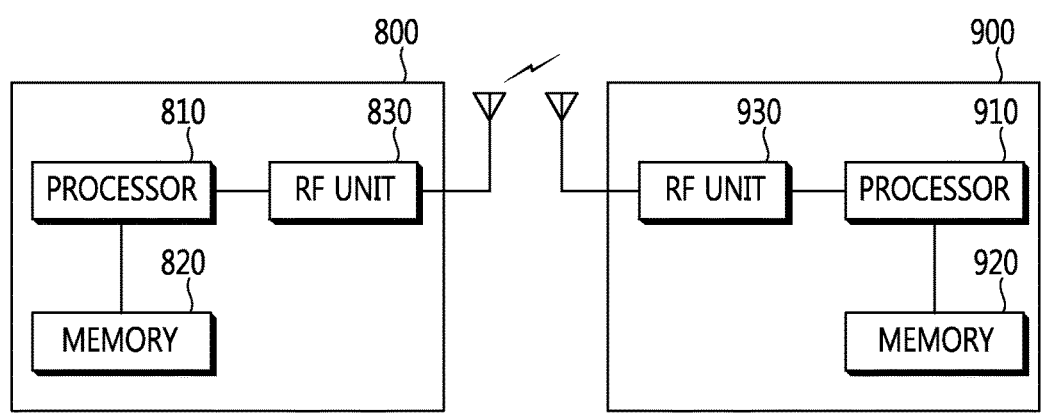
FIG. 12 is a block diagram showing wireless communication system to implement an embodiment of the present invention.

FIG. 12 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for applying, by a user equipment (UE), a security key in a wireless communication system, the method comprising:
   establishing both a first connection with a first evolved NodeB (eNB) and a second connection with a second eNB;
   obtaining a first security key used for the first eNB;
   deriving a second security key used for the second eNB from the first security key;
   deriving a user traffic key for the second eNB from the second security key with a ciphering algorithm for the second eNB; and
   applying the user traffic key for encryption or decryption of user traffic for the second eNB,
   applying the first security key,
   wherein the second security key is derived, by the first eNB, from the first security key and transmitted, by the first eNB, to the second eNB, and used by the second eNB, and
   wherein applying the first security key comprises:
   deriving a signaling key for integrity protection or ciphering of radio resource control (RRC) messages from the first security key; and
   applying the signaling key.

2. The method of claim 1, wherein the first eNB is a master eNB (MeNB); and
   wherein the second eNB is a secondary eNB (SeNB).

3. The method of claim 2, wherein the user traffic key is $K_{UPenc}$.

4. The method of claim 2, wherein the second security key is applied to radio bearers (RBs) of the SeNB.

5. The method of claim 2, wherein the second security key is applied to one or more cells of the SeNB.

6. The method of claim 2, further comprising obtaining a first security parameter indicating a first encryption algorithm for the MeNB.

7. The method of claim 2, wherein the first connection is a radio resource control (RRC) connection for signaling.

8. The method of claim 2, wherein the second connection is an L2 connection for user traffic.

9. The method of claim 1, wherein the signaling key is at least one of $K_{RRCint}$ or $K_{RRCenc}$.

10. A user equipment (UE) comprising:
    a memory;
    a radio frequency (RF) unit; and
    a processor, coupled to the memory and the RF unit, that:
    establishes both a first connection with a first evolved NodeB (eNB) and a second connection with a second eNB;
    obtains a first security key used for the first eNB;
    derives a second security key used for the second eNB from the first security key;
    derives a user traffic key for the second eNB from the second security key with a ciphering algorithm for the second eNB; and
    applies the user traffic key for encryption or decryption of user traffic for the second eNB,
    applies the first security key,
    wherein the second security key is derived, by the first eNB, from the first security key and transmitted, by the first eNB, to the second eNB, and used by the second eNB, and
    wherein applying the first security key comprises:
    deriving a signaling key for integrity protection or ciphering of radio resource control (RRC) messages from the first security key; and
    applying the signaling key.

* * * * *